United States Patent
Shapira et al.

(10) Patent No.: US 12,034,730 B1
(45) Date of Patent: Jul. 9, 2024

(54) SYSTEMS AND METHODS FOR DETECTING SANCTIONED APPLICATIONS USED IN AN ORGANIZATION

(71) Applicant: Recolabs Ltd., Tel Aviv (IL)

(72) Inventors: Tal Shapira, Tel-Aviv (IL); Dana Hohenstein, Givatayim (IL); Eyal Asulin, Tel-Aviv (IL)

(73) Assignee: RECOLABS LTD., Tel Aviv (IL)

( * ) Notice: Subject to any disclaimer, the term of this patent is extended or adjusted under 35 U.S.C. 154(b) by 0 days.

(21) Appl. No.: 18/611,771

(22) Filed: Mar. 21, 2024

(51) Int. Cl.
*G06Q 10/107* (2023.01)
*H04L 9/40* (2022.01)

(52) U.S. Cl.
CPC ......... *H04L 63/101* (2013.01); *G06Q 10/107* (2013.01); *H04L 63/102* (2013.01); *H04L 63/1408* (2013.01)

(58) Field of Classification Search
CPC ... H04L 63/101; H04L 63/102; H04L 63/105; H04L 63/107; H04L 63/108; H04L 63/16; H04L 63/1408; H04L 63/145
USPC ................................ 709/220, 224, 228, 231
See application file for complete search history.

(56) References Cited

U.S. PATENT DOCUMENTS

| | | | | |
|---|---|---|---|---|
| 10,628,144 | B2 * | 4/2020 | Myneni | G06F 9/45558 |
| 11,888,870 | B2 * | 1/2024 | Garyani | H04L 63/1425 |
| 2016/0065592 | A1 * | 3/2016 | Svigals | H04L 9/3231 726/3 |
| 2020/0026397 | A1 * | 1/2020 | Wohlstadter | G06F 3/04845 |
| 2020/0065080 | A1 * | 2/2020 | Myneni | H04L 63/1408 |
| 2021/0200393 | A1 * | 7/2021 | Wohlstadter | G06F 3/0485 |
| 2023/0334221 | A1 * | 10/2023 | Lefebvre | G06F 40/10 |
| 2024/0003995 | A1 * | 1/2024 | Rock | G01R 15/20 |
| 2024/0129338 | A1 * | 4/2024 | Azad | H04L 63/1491 |

FOREIGN PATENT DOCUMENTS

CA 2962648 A1 * 4/2007 ........... G06F 21/606

* cited by examiner

Primary Examiner — Khanh Q Dinh
(74) Attorney, Agent, or Firm — AlphaPatent Associates Ltd.; Daniel J. Swirsky

(57) ABSTRACT

A computing system for detecting shadow applications operating in devices used by an organization, the system including a memory and a processor configured to monitor incoming email messages received by email accounts of the organization, identify, from the incoming email messages, a first list of software services used by identities of the organization, collect from identity provider services a second list of software services used by identities of the organization via the identity provider services, identify a list of unsanctioned applications that appear in the first list and do not appear in the second list of software services, and update a database based on the list of unsanctioned applications.

16 Claims, 4 Drawing Sheets

SYSTEMS AND METHODS FOR DETECTING SANCTIONED APPLICATIONS USED IN AN ORGANIZATION

FIELD

The invention, in embodiments thereof, relates to applications operating in organizations and, more specifically, but not exclusively, to systems and methods for identifying sanctioned applications in organizations.

BACKGROUND

Enterprises use internet-based services, such as Office365, Box, Salesforce, Slack and others, to improve the organization's productivity, collaboration and business application workloads. Employees may use different internet-based services to achieve the same functionality, such as Zoom and Microsoft Teams to perform video conferences. However, the organization wishes all the employees to use the same application for regulatory matters, to verify that all the applications operating in the organization are sanctioned apps, which are software applications that have been officially approved or authorized for use within an organization or by a governing body. However, organizations find it challenging to monitor all the entities' activity to check that all the applications used in the organization are sanctioned apps.

SUMMARY

In one aspect of the invention a computing system is provided for detecting shadow applications operating in devices used by an organization, the system including a memory and a processor, configured to monitor incoming email messages received by email accounts of the organization; identify, from the incoming email messages, a first list of software services used by identities of the organization; collect from identity provider services a second list of software services used by identities of the organization via the identity provider services; identify a list of unsanctioned applications that appear in the first list and do not appear in the second list of software services; updating a database based on the list of unsanctioned applications.

In some cases, identifying the first list of software services is done by comparing text in the incoming email messages to a list of optional software services. In some cases, the processor is further configured to extract a subject and headers from the incoming email messages, wherein the subject and headers are compared to the list of optional software services. In some cases, the organizations include persons and services of the organization. In some cases, the processor is further configured to activate a classifier to identify from the incoming email messages that a specific entity uses a specific software service and add the specific software service to the first list of software services according to an output of the classifier.

In some cases, the classifier is further configured to filter incoming email messages that indicate usage interactions with software services from incoming email messages that indicate non-usage interactions with software services. In some cases, the classifier is further configured to output an indication that the incoming email message shows that a receiver of the incoming email message does not use the software service and does not have an account in the software service. In some cases, the classifier is further configured to output an indication that a receiver of the incoming email message is an active user who has an account in the software service. In some cases, the classifier is further configured to output an indication that a receiver of the incoming email message is an active user without an account. In some cases, the classifier is further configured to output an indication that the incoming email message that the email is a marketing email or a newsletter from the software service.

In some cases, the processor is further configured to: extract additional information from web-based resources about the software services appearing in the incoming email messages; consolidate the software services appearing in the incoming email messages according to the additional information from web-based resources by removing duplications of software services.

In some cases, the processor is further configured to: extract additional information from web-based resources about the software services appearing in the data collected from the identity provider services; consolidate the software services appearing in the data collected from the identity provider services according to the additional information from web-based resources by removing duplications of software services. In some cases, the processor is further configured to filter internal organizational applications from the consolidated software services appearing in the data collected from the identity provider services.

In some cases, the first list includes a list of identities in the organization that uses each of the software services. In some cases, the processor is further configured to identify private software services and enterprise software services from the list of unsanctioned applications. In some cases, the processor is further configured to identify consumer software services and enterprise software services from the list of unsanctioned applications.

In some cases, the processor is further configured to: consolidate the software services appearing in the first list of software services according to additional information from web-based resources by removing duplications of software services; consolidate the software services appearing in the second list of software services according to additional information from web-based resources by removing duplications of software services; wherein consolidating the software services appearing in the second list and consolidating the software services appearing in the second list is done in the same technique to enable comparison of the first list and the second list after consolidation.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

At least some embodiments of the invention described herein address the technical problem of unsanctioned software applications operating in an organization, such as an enterprise, a government agency, and the like. Enterprises use internet-based services, such as Office365, Box, Salesforce, Slack and others, to improve the organization's productivity, collaboration and business application workloads. Employees may use different internet-based services to achieve the same functionality, such as Zoom and Microsoft Teams to perform video conferences. However, the organization wishes all the employees to use the same application for regulatory matters, to verify that all the applications operating in the organization are sanctioned apps, which are software applications that have been officially approved or authorized for use within an organization or by a governing body. However, organizations find it challenging to monitor all the entities' activity to check that all the applications used in the organization are sanctioned apps.

One technical solution is a computing system and method configured to monitor both the incoming email messages in the organization and Identity Providers (IDPs) used by the organization's employees. Identity Providers are centralized services that manage user identities and authentication for accessing various applications and resources within an organization's IT infrastructure or across different systems, such as Okta, Google Workspace and the like.

Figure 1:
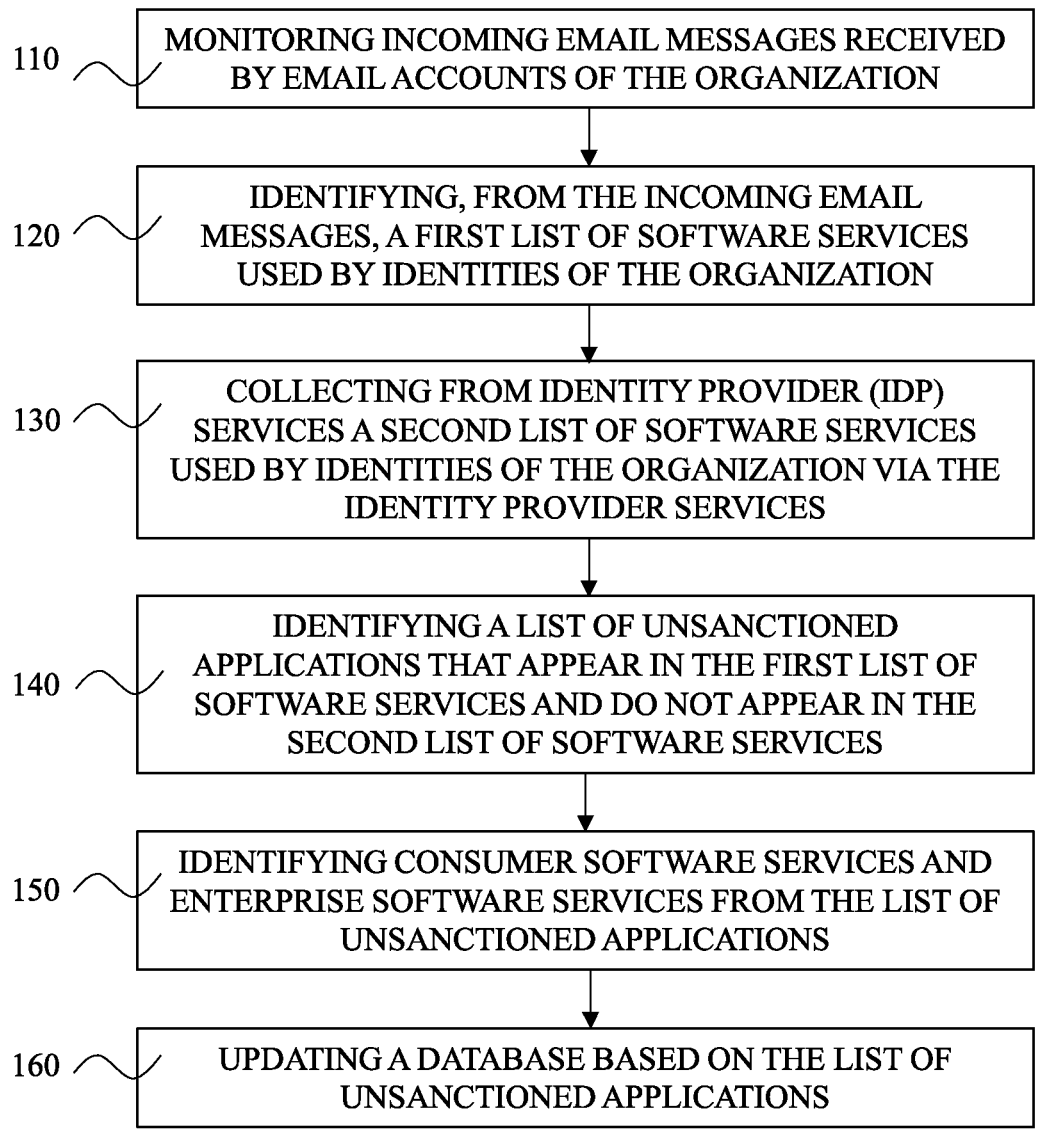
FIG. 1 shows a flowchart of a method of detecting unsanctioned software services used in an organization, in accordance with some embodiments of the invention.

FIG. 1 shows a flowchart of a method of detecting unsanctioned software services used in an organization, in accordance with some embodiments of the invention.

Step 110 discloses monitoring incoming email messages received by email accounts of the organization. The monitoring may be done using an API installed on an email server that manages the distribution of incoming email messages into the email addresses operated by entities in the organization. The entities may be persons, virtual machines, and services. The monitoring may include extracting predefined sections of the incoming email messages and sending the extracted sections for analysis, the output of the analysis is identifying whether or not an entity uses a software service.

Step 120 discloses identifying, from the incoming email messages, a first list of software services used by identities of the organization. The incoming email messages are a common technique for software services to communicate with users, for example for registration, update, usage, authentication, and the like. The identifying process may comprise identifying the details of the software service from the incoming email messages, the details may include name, address, billing data, date of first use, email address of the software service, physical address of the software service, and the like. The identifying process may also comprise identifying whether the incoming email message indicates usage of the software service or non-usage of the software service. Non-usage may be a marketing email, software update, and the like.

Step 130 discloses collecting from identity provider (IDP) services a second list of software services used by identities of the organization via the identity provider services. The second list of software services defines a list of sanctioned services authorized by the organization.

The identity provider services monitor the software services used by the organization entities when the entities use the identities provided by the IDPs. The list of software services may be provided by the IDPs on demand, in response to an event such as a security breach, once every predefined period, for example once a week, and the like. The second list of software services may be sent to a control application used by IT personnel of the organization.

Step 140 discloses identifying a list of unsanctioned applications that appear in the first list of software services and do not appear in the second list of software services. For example, the first list includes 110 applications used by the user, of which 97 are known to the IDPs. That is, 13 applications are considered unsanctioned applications.

Step 150 discloses identifying consumer software services and enterprise software services from the list of unsanctioned applications. Consumer software services are software services used by persons for consumer use, for example, "Uber", mobile applications used for price comparison, video conferences, photo editors, e-commerce platforms, and the like. It is desired by the organization to filter unsanctioned enterprise services from unsanctioned consumer services, as the latter are not used for the organization's business goals.

Step 160 discloses updating a database based on the list of unsanctioned applications. The database may be coupled to a control panel or a dashboard accessed to the organization's managers or IT personnel. The database may be installed on a virtual machine or in the organization's electronic devices such as servers.

Figure 2:
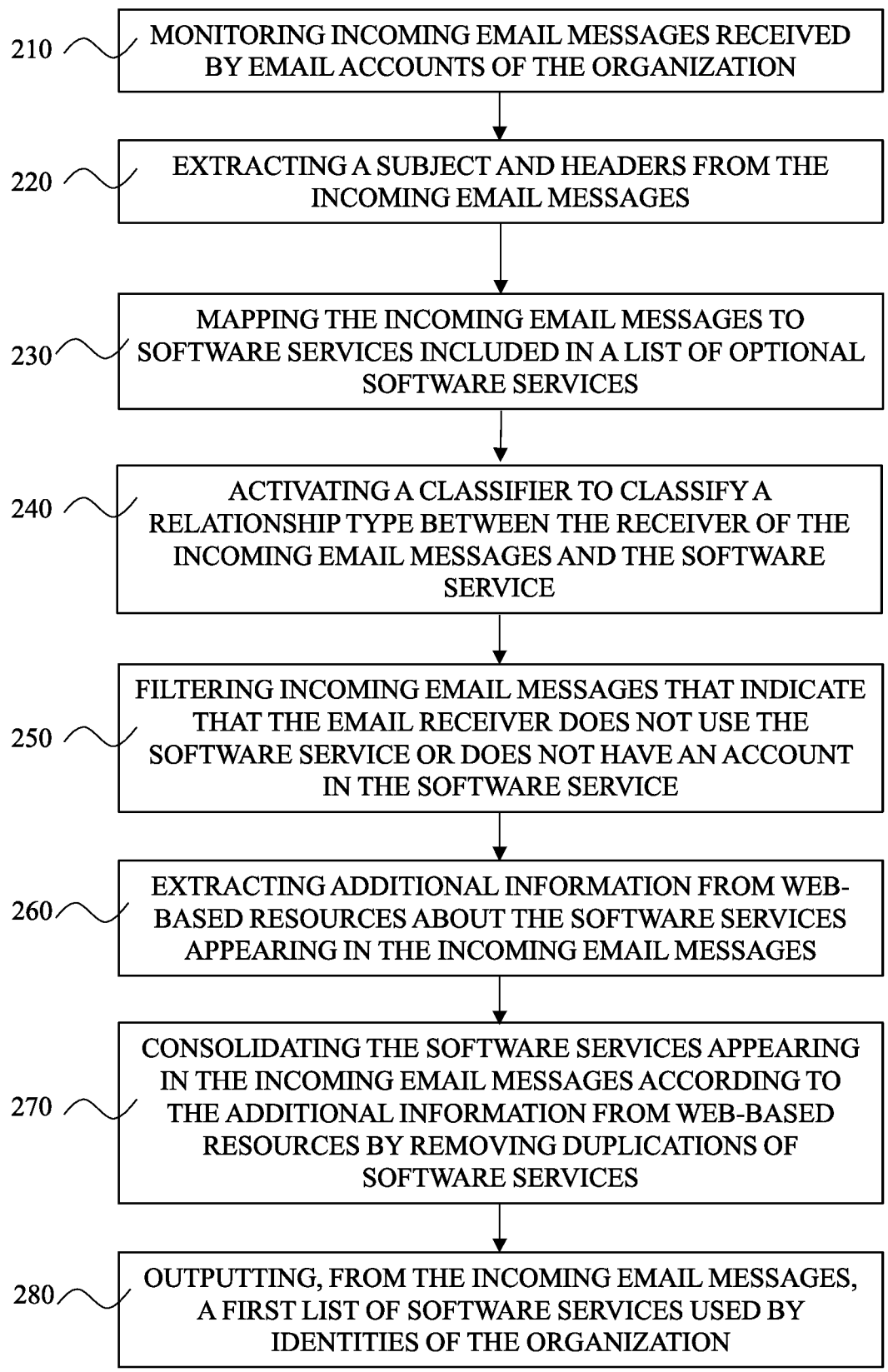
FIG. 2 shows a flowchart of a method of outputting a list of software services used in an organization based on incoming email messages, in accordance with some embodiments of the invention.

FIG. 2 shows a flowchart of a method of outputting a list of software services used in an organization based on incoming email messages, in accordance with some embodiments of the invention.

Step 210 discloses monitoring incoming email messages received by email accounts of the organization. The monitoring may be done using an API installed on an email server that manages the distribution of incoming email messages into the email addresses operated by entities in the organization. The entities may be persons, virtual machines, and services. The monitoring may include extracting predefined sections of the incoming email messages and sending the extracted sections for analysis, the output of the analysis is identifying whether or not an entity uses a software service.

Step 220 discloses extracting a subject and headers from the incoming email messages. The extraction may be done after parsing the email. The extraction may be done after automatically removing all the personal information of the identity that received the incoming email message.

Step 230 discloses mapping the incoming email messages to software services included in a list of optional software services. The list of optional software services may be stored in an online directory or in a virtual machine or a server accessed to the computing system that performs the processes described herein. The list of optional software services may be updated periodically to identify new services. Mapping may be performed by identifying whether or not headers or other parts of the incoming email message is related to a specific software service included in the list. If not, the email message is filtered and the process for the email ends.

Step 240 discloses activating a classifier to classify a relationship type between the receiver of the incoming email messages and the software service. The relationship type may be "not registered to the service", "registered and inactive", "active user" and the like. The classifier may output an indication that the incoming email message shows that the user does not use the software service and does not have an account in the software service. The classifier may output that the user is an active user who has an account in the software service or an active user without an account. The classifier may output that the email is just a marketing email or a newsletter from the software service.

Step 250 discloses filtering incoming email messages that indicate that the email receiver does not use the software service or does not have an account in the software service. In such case, the classifier classifies the incoming email message to indicate non-usage interactions with software services. Non-usage may be a marketing email, software update, and the like. Filtering may be done by the classifier, using a set of rules, or using another technique desired by a person skilled in the art.

Step 260 discloses extracting additional information from web-based resources about the software services appearing in the incoming email messages. The extraction may be done using a web scraper or by accessing a known database or other type of data accessible using a URL. The additional information may be the names of the owner of the service provider, billing addresses of the service provider, physical addresses of the service provider's offices, optional billing plans offered by the service provider, and the like.

Step 270 discloses consolidating the software services appearing in the incoming email messages according to the additional information from web-based resources by removing duplications of software services. The consolidation process may receive as input 120 names of software services and output less than 120 names, as some of the names represent the same software service. For example, a video conferencing service may use the main brand for some of the IDPs (for example "Zoom") and may use a brand combined with the IDP's name (for example "Zoom for Google") while both refer to the video conference service provided by Zoom.

Step 280 discloses outputting, from the incoming email messages, a first list of software services used by identities of the organization. The list may include the number of users that use each of the application. the list may include the usernames of the users that use each of the applications. the list may include the date of the last email message received from each of the software services.

Figure 3:
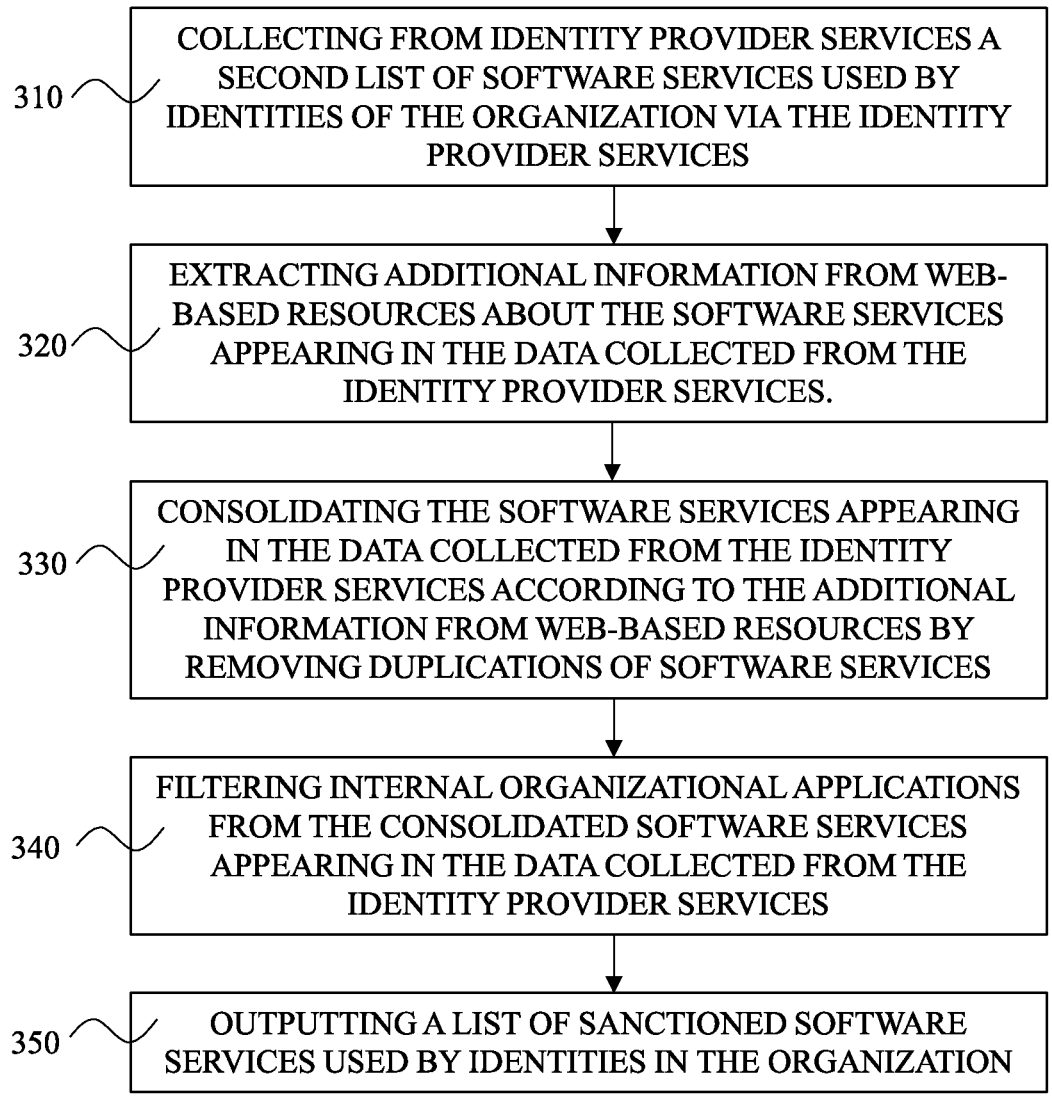
FIG. 3 shows a flowchart of a method of detecting sanctioned software services used in an organization, in accordance with some embodiments of the invention.

FIG. 3 shows a flowchart of a method of detecting sanctioned software services used in an organization, in accordance with some embodiments of the invention.

Step 310 discloses collecting from identity provider services a second list of software services used by identities of the organization via the identity provider services. The data collected from the identity provider may be received via an API, using logs and reports provided by the identity provider services.

Step 320 discloses extracting additional information from web-based resources about the software services appearing in the data collected from the identity provider services. The extraction may be done using a web scraper or by accessing a known database or other type of data accessible using a URL. The additional information may be the names of the owner of the service provider, billing addresses of the service provider, physical addresses of the service provider's offices, optional billing plans offered by the service provider, and the like.

Step 330 discloses consolidating the software services appearing in the data collected from the identity provider services according to the additional information from web-based resources by removing duplications of software services. The consolidation process may receive as input 120 names of software services and output less than 120 names, as some of the names represent the same software service. For example, a video conferencing service may use the main brand for some of the IDPs (for example "Zoom") and may use a brand combined with the IDP's name (for example "Zoom for Google") while both refer to the video conference service provided by Zoom. In some cases, consolidating the software services appearing in the second list and consolidating the software services appearing in the second list is done in the same technique to enable comparison of the first list and the second list after consolidation.

Step 340 discloses filtering internal organizational applications from the consolidated software services appearing in the data collected from the identity provider services. The filtering process outputs only sanctioned applications used in the organization, as the internal applications are defined as applications only used inside the organization, for example in order to provide services unique to the organization or services the organization prefers to keep confidential. For example, the filtering process may receive 100 consolidated software services, identifies 10 internal organizational applications and outputs 90 sanctioned applications used in the organization.

Step 350 discloses outputting a list of sanctioned software services used by identities in the organization. Outputting may be done by sending the list of sanctioned applications via a messaging applications such as Slack or Jira, or over email. Outputting may be done by updating the list in a control application used by the organization IT staff to be displayed in a dashboard format.

Figure 4:
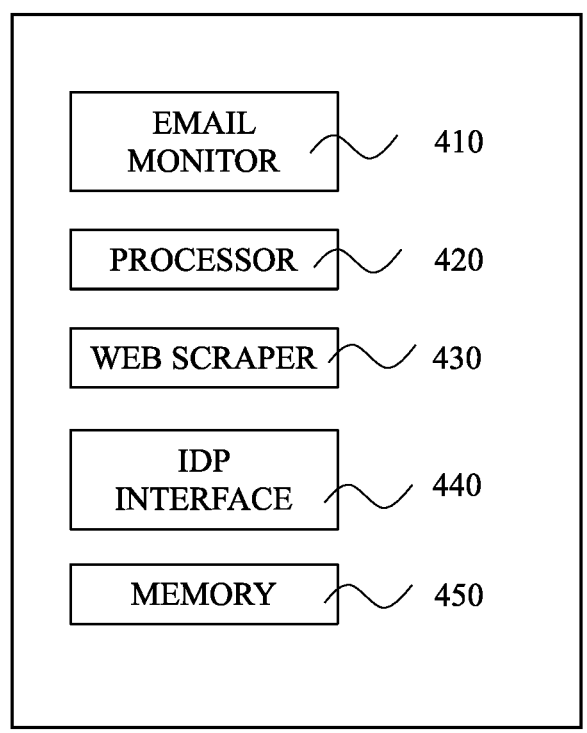
FIG. 4 shows a computing system for detecting unsanctioned software services used in an organization, in accordance with some embodiments of the invention.

FIG. 4 shows a computing system for detecting unsanctioned software services used in an organization, in accordance with some embodiments of the invention. In various embodiments, the computing system described above performs a specific process for detecting unsanctioned software services described in greater detail herein. In certain embodiments, the detection of unsanctioned applications prevents optional security events and saves memory as only sanctioned applications are used by the organization's devices, hence improving processor efficiency, and thus the efficiency of the organization's devices. Once the computing system is configured to perform the process for detecting unsanctioned software services, the computing system becomes a specialized computing device specifically configured to perform the process for detecting unsanctioned software services and is not a general-purpose computing device.

The computing system comprises an email monitor 410 configured to monitor incoming email messages into email accounts used by entities of the organization. The email monitor 410 may be implemented as an API or another software or hardware mechanism having access to an email server or to the email accounts used by entities of the organization. The email monitor 410 may send the incoming email messages to a processor 420 for analysis, or extract specific parts of the incoming email message, such as headers, subject, sender email address, and the like. Processor 420 may be any one or more processors such as a Central Processing Unit (CPU), a microprocessor, an electronic circuit, an Integrated Circuit (IC) or the like. Processor 420 may be utilized to perform computations required by the apparatus or any of its subcomponents.

The computing system may also comprise a web scraper 430 configured to extract data from web-based resources such as web pages, folders, databases, and the like. The extracted data may be used to consolidate software services extracted from the incoming email messages or from the IDP.

The computing system may also comprise an IDP interface 440 to one or more IDPs, for receiving interactions performed by the organization's entities via the IDP, for example, requests to use software services, entities created by the organization's users using the IDPs, and the like. In some cases, the system may comprise multiple IDP interfaces, one interface for each IDP (Google Workspace, Microsoft, Okta and the like).

The computing system comprises a memory 450. The memory 450 may be a hard disk drive, a Flash disk, a Random Access Memory (RAM), a memory chip, or the like. In some exemplary embodiments, memory 450 can retain program code operative to cause processor 420 to perform acts associated with any of the subcomponents of the computing system.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant files and/or records will be developed and the scope of the term file and/or record is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended that the invention embraces all such alternatives, modifications and variations.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the invention. To the extent that section headings are used, they should not be construed as necessarily limiting. In addition, any priority document(s) of this application is/are hereby incorporated herein by reference in its/their entirety.

What is claimed is:

1. A computing system for detecting shadow applications operating in devices used by an organization, the system comprising a memory and a processor, configured to:

monitor incoming email messages received by email accounts of the organization;

identify, from the incoming email messages, a first list of software services used by identities of the organization;

collect from identity provider services a second list of software services used by identities of the organization via the identity provider services;

identify a list of unsanctioned applications that appear in the first list and do not appear in the second list of software services;

update a database based on the list of unsanctioned applications;

consolidate the software services appearing in the first list of software services according to additional information from web-based resources by removing duplications of software services;

consolidate the software services appearing in the second list of software services according to additional information from web-based resources by removing duplications of software services; and wherein consolidating the software services appearing in the second list and consolidating the software services appearing in the second list is done in the same technique to enable comparison of the first list and the second list after consolidation.

2. The system of claim 1, wherein identifying the first list of software services is done by comparing text in the incoming email messages to a list of optional software services.

3. The system of claim 2, wherein the processor is further configured to extract a subject and headers from the incoming email messages, wherein the subject and headers are compared to the list of optional software services.

4. The system of claim 1, wherein the organizations include persons and services of the organization.

5. The system of claim 1, wherein the processor is further configured to activate a classifier to identify from the incoming email messages that a specific entity uses a specific software service and add the specific software service to the first list of software services according to an output of the classifier.

6. The system of claim 5, wherein the classifier is further configured to filter incoming email messages that indicate usage interactions with software services from incoming email messages that indicate non-usage interactions with software services.

7. The system of claim 5, wherein the classifier is further configured to output an indication that the incoming email message shows that a receiver of the incoming email message does not use the software service and does not have an account in the software service.

8. The system of claim 5, wherein the classifier is further configured to output an indication that a receiver of the incoming email message is an active user who has an account in the software service.

9. The system of claim 5, wherein the classifier is further configured to output an indication that a receiver of the incoming email message is an active user without an account.

10. The system of claim 5, wherein the classifier is further configured to output an indication that the incoming email message that the email is a marketing email or a newsletter from the software service.

11. The system of claim 1, wherein the processor is further configured to: extract additional information from web-based resources about the software services appearing in the incoming email messages; and consolidate the software services appearing in the incoming email messages according to the additional information from web-based resources by removing duplications of software services.

12. The system of claim 1, wherein the processor is further configured to: extract additional information from web-based resources about the software services appearing in the data collected from the identity provider services; and consolidate the software services appearing in the data collected from the identity provider services according to the additional information from web-based resources by removing duplications of software services.

13. The system of claim 12, wherein the processor is further configured to filter internal organizational applications from the consolidated software services appearing in the data collected from the identity provider services.

14. The system of claim 1, wherein the first list includes a list of identities in the organization that uses each of the software services.

15. The system of claim 1, wherein the processor is further configured to identify private software services and enterprise software services from the list of unsanctioned applications.

16. The system of claim 1, wherein the processor is further configured to identify consumer software services and enterprise software services from the list of unsanctioned applications.

\* \* \* \* \*